(12) United States Patent
Ozturk et al.

(10) Patent No.: US 11,153,792 B2
(45) Date of Patent: Oct. 19, 2021

(54) SIGNALING FOR INACTIVE MOBILITY

(71) Applicant: QUALCOMM Incorporated, San Diego, CA (US)

(72) Inventors: Ozcan Ozturk, San Diego, CA (US); Gavin Bernard Horn, La Jolla, CA (US); Soo Bum Lee, San Diego, CA (US); Keiichi Kubota, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 16/386,880

(22) Filed: Apr. 17, 2019

(65) Prior Publication Data

US 2019/0327647 A1    Oct. 24, 2019

Related U.S. Application Data

(60) Provisional application No. 62/659,481, filed on Apr. 18, 2018.

(51) Int. Cl.
| | |
|---|---|
| *H04W 36/00* | (2009.01) |
| *H04W 76/16* | (2018.01) |
| *H04W 12/10* | (2021.01) |
| *H04W 76/27* | (2018.01) |
| *H04W 8/08* | (2009.01) |
| *H04W 84/20* | (2009.01) |

(52) U.S. Cl.
CPC ......... *H04W 36/0033* (2013.01); *H04W 8/08* (2013.01); *H04W 12/10* (2013.01); *H04W 36/0069* (2018.08); *H04W 76/16* (2018.02); *H04W 76/27* (2018.02); *H04W 84/20* (2013.01)

(58) Field of Classification Search
CPC . H04W 36/0033; H04W 76/16; H04W 76/27; H04W 36/0069; H04W 8/08; H04W 12/10
See application file for complete search history.

(56) References Cited

U.S. PATENT DOCUMENTS

| | | | |
|---|---|---|---|
| 2018/0213452 A1* | 7/2018 | Kim ................. | H04W 36/0038 |
| 2018/0234839 A1* | 8/2018 | Tenny .................... | H04W 8/26 |
| 2019/0253939 A1* | 8/2019 | Zhang ................... | H04W 36/00 |
| 2020/0037285 A1* | 1/2020 | Sivavakeesar ...... | H04W 68/005 |
| 2020/0128454 A1* | 4/2020 | Teyeb ................... | H04W 36/00 |
| 2020/0169906 A1* | 5/2020 | Tsuboi ................. | H04W 24/10 |
| 2020/0187297 A1* | 6/2020 | Jiang .................... | H04W 80/04 |
| 2020/0275508 A1* | 8/2020 | Hu ........................ | H04W 76/18 |

FOREIGN PATENT DOCUMENTS

| | | |
|---|---|---|
| EP | 3481135 A1 | 5/2019 |
| KR | 20180004393 A | 1/2018 |
| WO | WO-2018014741 A1 | 1/2018 |

OTHER PUBLICATIONS

International Search Report and Written Opinion—PCT/US2019/028120—ISA/EPO—dated Aug. 21, 2019.

* cited by examiner

*Primary Examiner* — Ronald B Abelson
(74) *Attorney, Agent, or Firm* — Michael J. DeHaemer, Jr.

(57) ABSTRACT

Certain aspects of the present disclosure relate to methods and apparatus for signaling to and/or from a UE in an inactive state.

25 Claims, 11 Drawing Sheets

SIGNALING FOR INACTIVE MOBILITY

CLAIM OF PRIORITY UNDER 35 U.S.C. § 119

The present Application for Patent claims benefit of U.S. Provisional Patent Application Ser. No. 62/659,481, filed Apr. 18, 2018, assigned to the assignee hereof and hereby expressly incorporated by reference herein.

FIELD

The present disclosure relates generally to communication systems, and more particularly, to methods and apparatus for optimizing signaling to and/or from a user equipment (UE) in an inactive network state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to techniques for optimizing signaling to and/or from a user equipment in an inactive network state.

Certain aspects of the present disclosure provide a method for wireless communication by a UE. The method generally includes receiving signaling of a configuration to establish a signaling radio bearer (SRB) with a first link to a first base station and a second link to a second base station, transitioning to an inactive state where context of the UE in the network is maintained at the UE and at least the first base station, and communicating with the network using the SRB while in the inactive state.

Certain aspects of the present disclosure provide a network entity. The method generally includes signaling, to a user equipment (UE), a configuration to establish a signaling radio bearer (SRB) with a first link to the network entity and a second link to another network entity, transitioning the UE to an inactive state where context of the UE in the network is maintained at the UE and at least the first base station, and communicating with the UE via the SRB while the UE is in the inactive state.

Certain aspects of the present disclosure provide a network entity. The method generally includes receiving a message from a user equipment (UE) in an inactive state via a signaling radio bearer (SRB) with a first link to the network entity and a second link to another network entity and forwarding the message to the second network entity.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
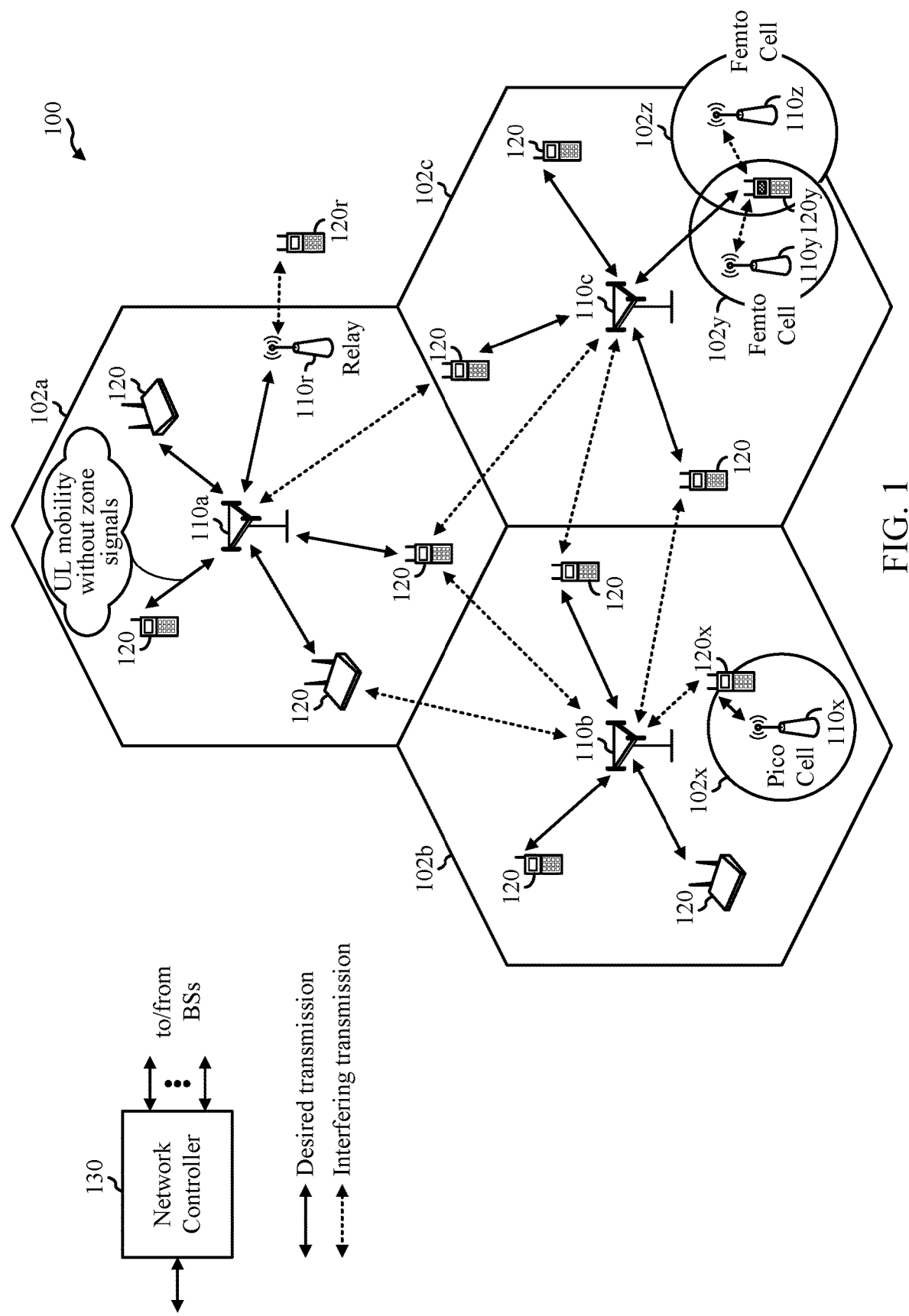
FIG. 1 is a block diagram conceptually illustrating an example telecommunications system, in accordance with certain aspects of the present disclosure.

Aspects of the present disclosure provide apparatus, methods, processing systems, and computer readable mediums that may be used in wireless communications systems, such as new radio (NR) (new radio access technology or 5G technology) systems. For example, certain techniques presented herein provide signaling for a radio access network (RAN) notification area (RNA) update procedure.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to optimizing signaling to and/or from a UE that is in an inactive network state, for example, as part of an RNA update procedure when a UE moves to a different serving base station (gNB).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, UEs 120 and base stations 110 of the wireless network 100 may perform operations shown in FIGS. 9, 10, and 11, as part of an RNA update procedure.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may communicate with a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz).

Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 6:
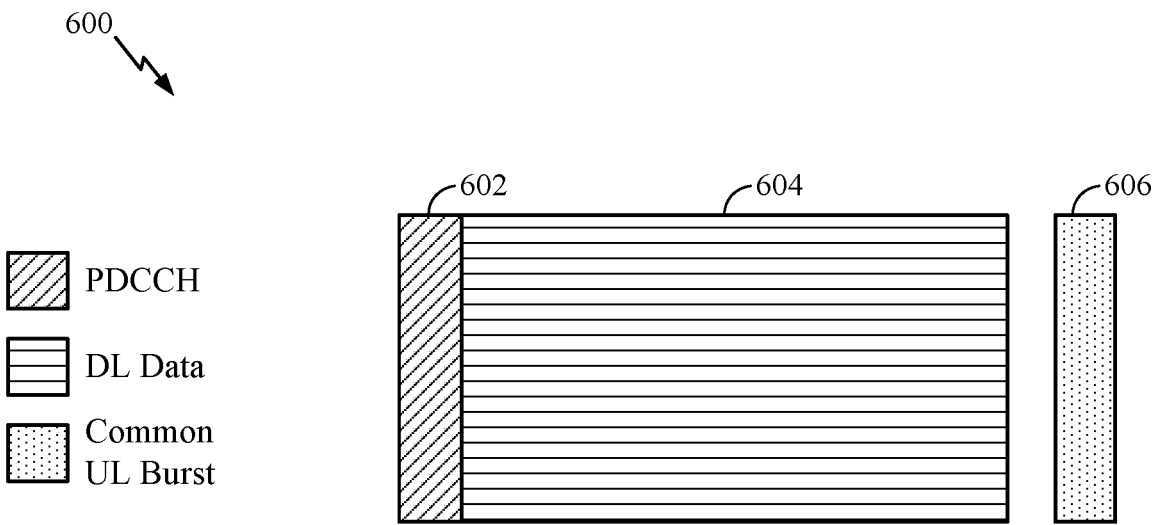
FIG. 6 illustrates an example of a DL-centric subframe, in accordance with certain aspects of the present disclosure.
Figure 7:
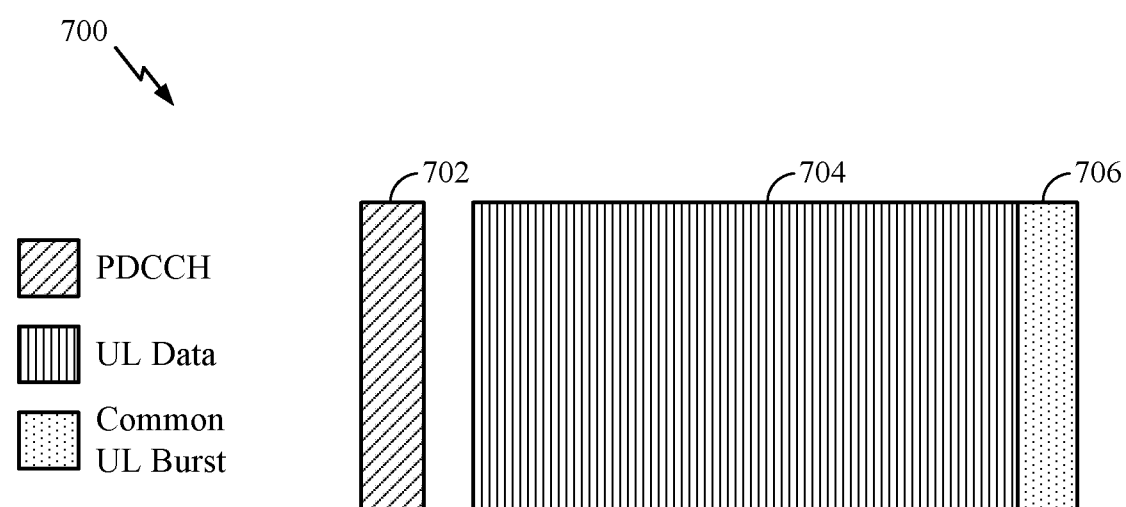
FIG. 7 illustrates an example of an UL-centric subframe, in accordance with certain aspects of the present disclosure.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
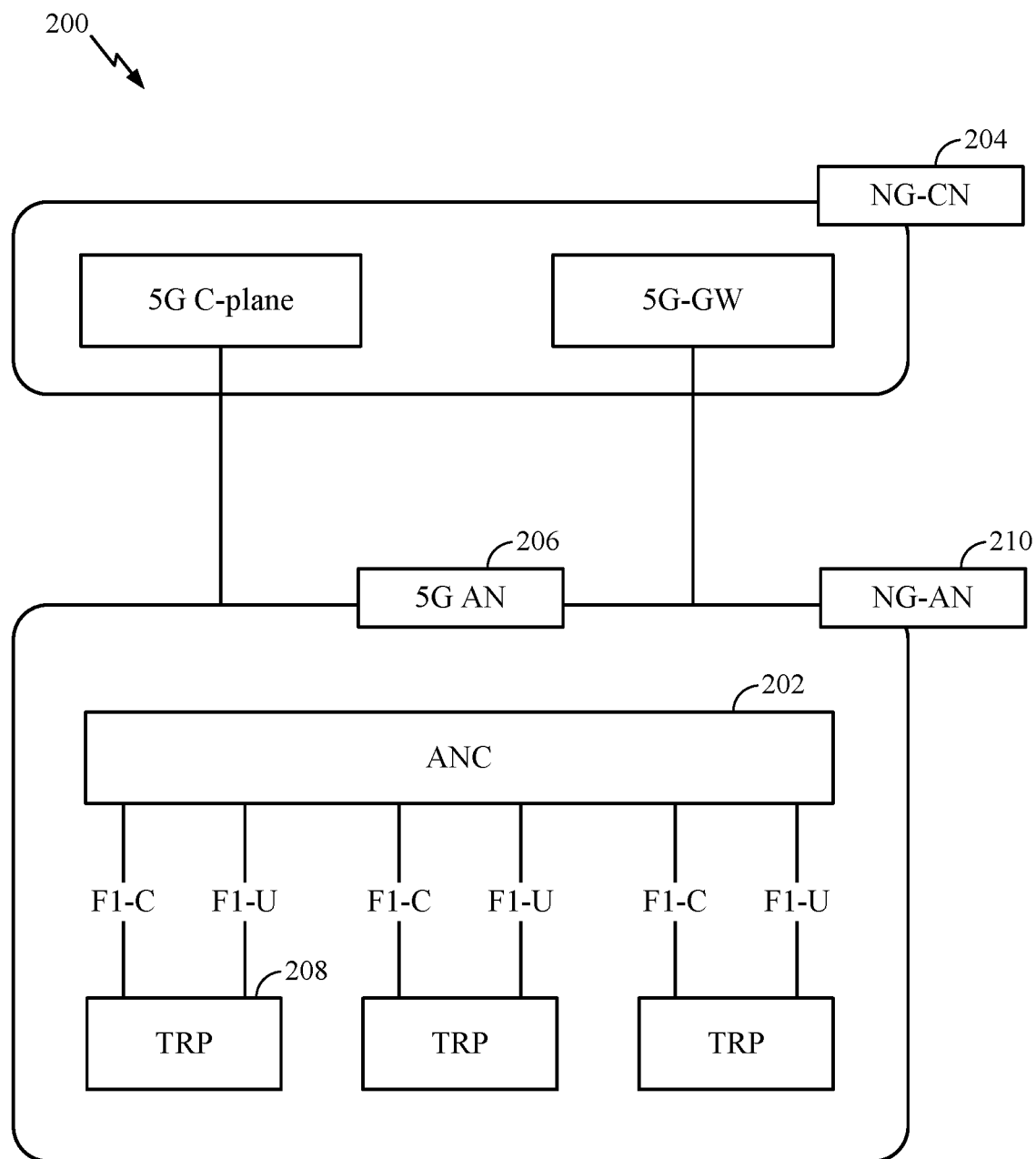
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
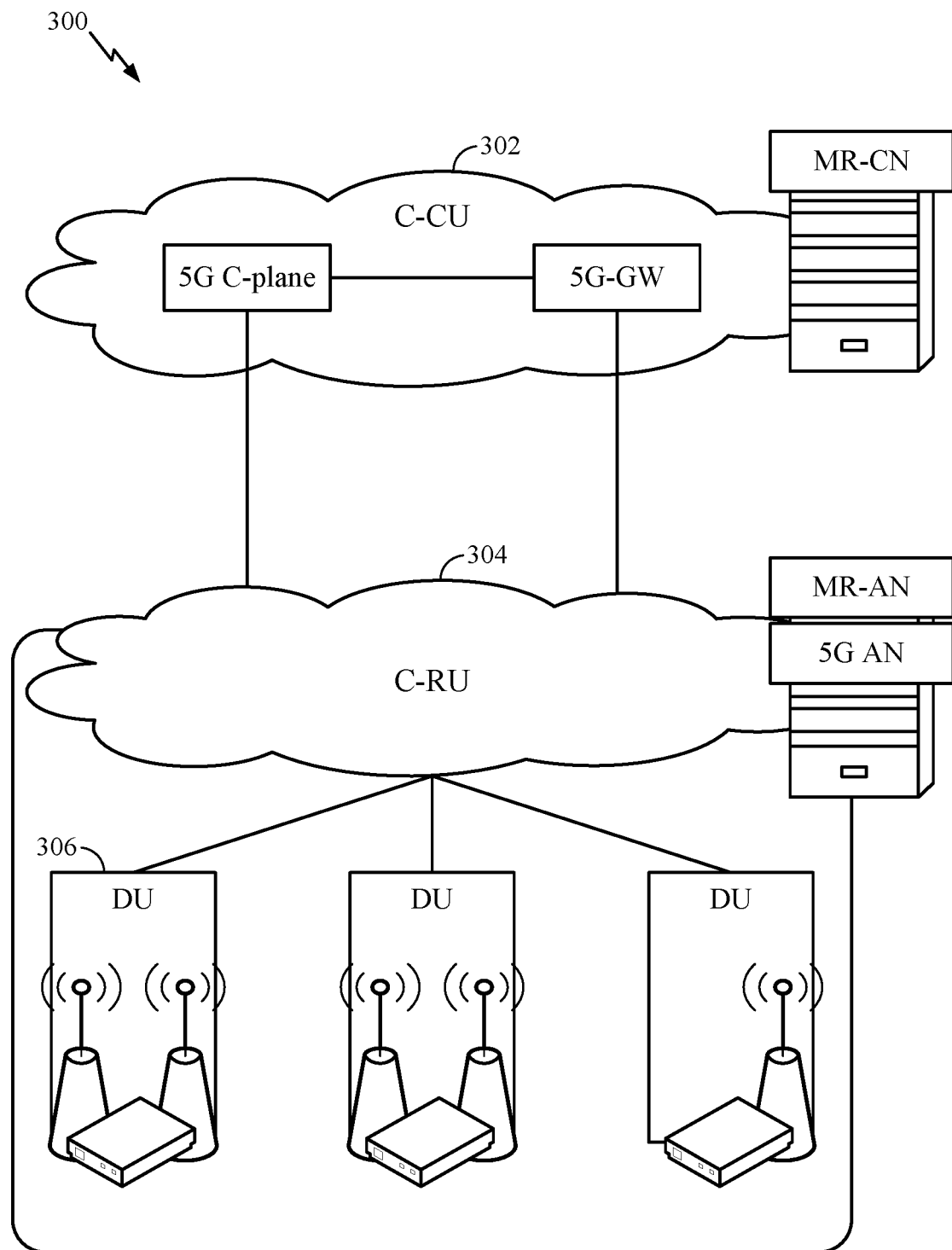
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
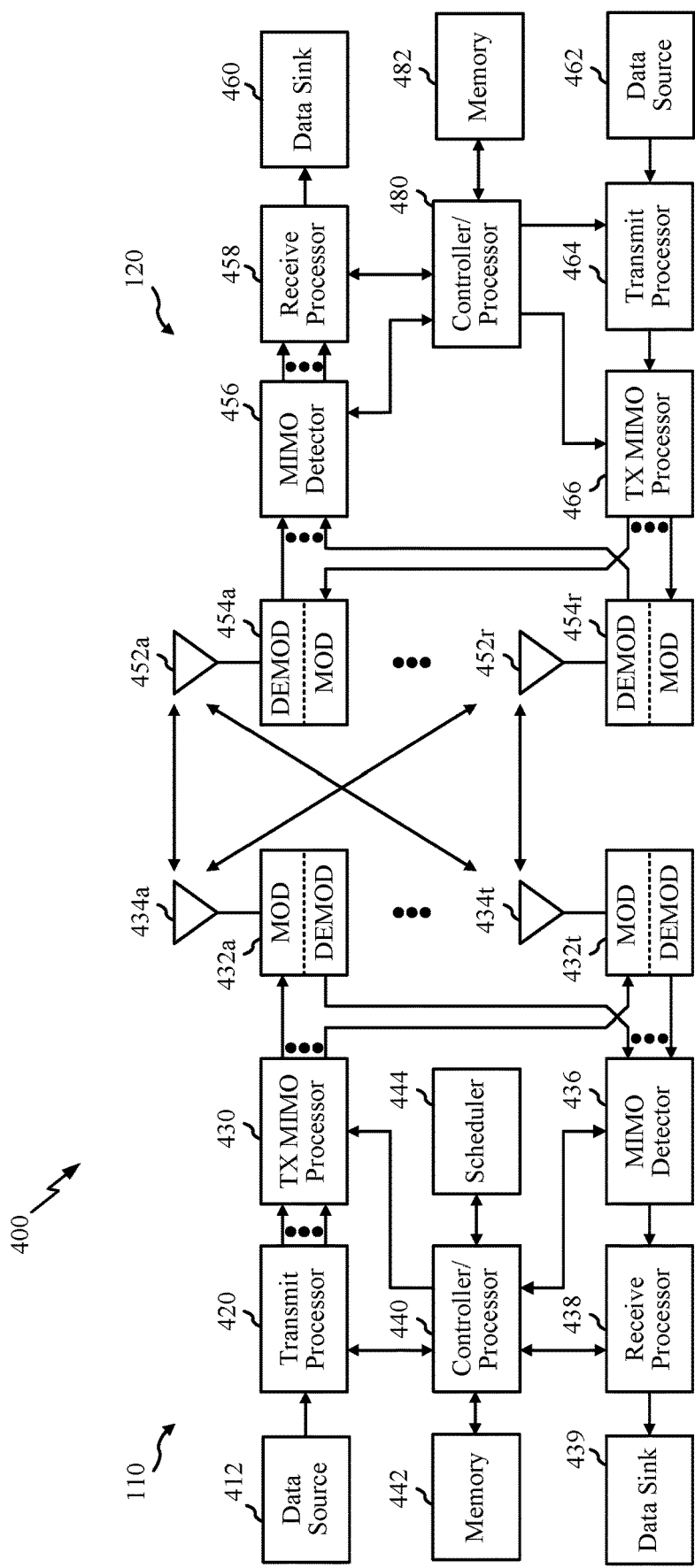
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9, 10 and/or 11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 13, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
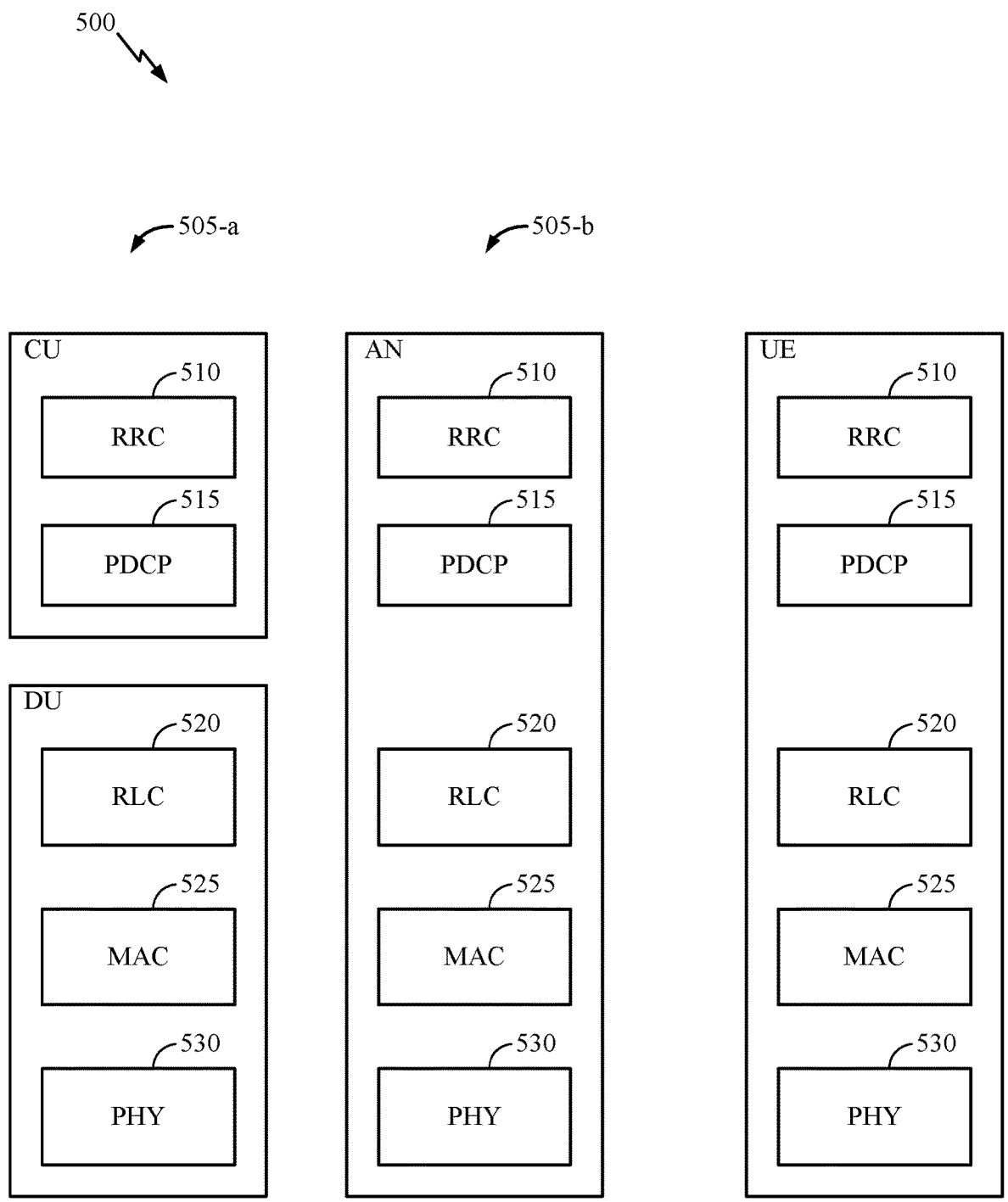
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Inactive State

There are various Internet of Things (IoT) and other types of applications that involve an exchange of relatively small amounts of data. For example, metering and alarm applications typically involve a small amount of mobile originated (MO) data, while various queries, notifications of updates, enabling actuators, and the like involve a small amount of mobile terminated (MT) data. Unfortunately, establishing a connection between a mobile device and network involves a large overhead (relative to the small amount of data).

In some cases, a UE may be placed in an inactive "RAN controlled" state that represents a middle ground between a connected state and an idle state. For example, a UE in an inactive "RAN controlled" connected state (e.g., RRC_INACTIVE state) may have various characteristics. These characteristics may include maintaining the CN/RAN connection, storing the Access Stratum (AS) context in RAN. In addition, the network may know the (inactive) UE's location within an area and UE performs mobility within that area without notifying the network. As a result, RAN can trigger paging of UEs which are in the RAN controlled "inactive state" without dedicating a significant amount of resources.

Allowing data transmission to or from a mobile device (e.g., a UE) that is in an RRC_INACTIVE state may make sense if the UE has small amount of data to transmit and RAN has no or small amount of data to transmit in the state. If either the UE or RAN has subsequent data to transmit, the overhead to move to an active connected state (e.g., RRC_CONNECTED mode) may be justified, so that the data can be sent with dedicated resources.

As described above, in the inactive state, the UE context is kept at the UE and gNB. The difference compared to Connected mode is that the UE does not need to monitor physical data channels and send channel feedback and can perform mobility similar to Idle mode without informing the network, except for radio access network based area (RNA) updates (RNAUs).

When the UE moves to a different gNB to access the network (referred to as a serving gNB) in Inactive mode, the UE can perform a RNA update due to expiration of a periodic RAN update timer. In this case, the current serving gNB can decide to send the UE back to the Inactive state or move the UE to Idle.

Example Optimizations for Signaling to/from a UE in an Inactive State

Aspects of the present disclosure may help address certain challenges presented regarding which signaling radio bearers (SRBs) and what type of security to use in response to the RNAU (and/or other signaling while the UE is in an inactive state).

Such challenges may be explained considering various scenarios and the desirability or need for integrity protection or not. Certain types of SRBs utilize ciphering and integrity protection (e.g., SRB1), while others do not (SRB0).

For example, in some cases, the message to move the UE back to Inactive when the UE wants to resume the connection may not need to be protected. Thus, such messages may be treated in a similar to an RRC Reject message with a wait timer, which is typically not protected. Thus, this message may be sent over SRB0 (without integrity protection). On the other hand, the message to move the UE to an Idle state from an Inactive state should be at least integrity protected and, thus, should be sent over SRB1.

While the cases above describe how to handle the general resume from an Inactive state, different procedures may be used to handle RNA updates. How RNA updates are handled can determine whether or not UE context is moved (from an anchor gNB to a serving gNB). For example, if the serving gNB requests and receives the UE context where the UE was last connected to (referred to as the anchor gNB), then all the messages can be sent over SRB1. However, it is sometimes preferable not to move the UE context, since keeping the context at the anchor can enable less signaling towards the UE, which is beneficial for UE power consumption. As used herein, UE context generally refers to a block of information (at a gNB) associated with a particular active UE. It generally includes all the security information and associations between the UE and the logical connections used for messaging.

A related issue is mobility in Inactive mode when the UE is configured with Dual Connectivity (DC). 3GPP Rel-15 supports DC operation between LTE and NR RANs where LTE is the Master node (MN) and NR is the secondary node (SN), called EN-DC (E-UTRAN New Radio-Dual Connectivity). Similarly, there could be NE-DC where NR is the MN and LTE is the SN, or even NR only DC (in which different NR entities act as MN and SN).

In any cases, it is expected that the Inactive mode with DC will be supported. In this case, if the UE moves to another SN, an update message from the UE can be sent to the MN or to the new SN. Then, if the MN decides to reply to the UE via the new SN, the question of which SRB to use and what security to apply arises again.

Aspects of the present disclosure provide techniques for efficient signaling (to or from) a UE in an inactive state and for transitioning to a different state when appropriate (e.g., to an IDLE or CONNECTED state). As will be described below, by configuring the UE with a signaling radio bearer (SRB) before transitioning the UE into an inactive state, the overhead associated with transferring the UE context may be minimized or at least mitigated.

In some cases, the UE may be configured with what may be considered a "split" SRB with connections (links) to both a previously serving (e.g., anchor) base station and a new (target) base station. For example, in a DC scenario, a UE may have a split SRB with a first link to an MN and a second link to an SN. In other cases, a UE may be configured with a "virtual split" SRB where one of the links is "floating" meaning the UE may only use that link if the UE resumes with a new node (if the UE resumes in a previous serving node that link may not be used).

The techniques generally allow, while a UE is an inactive state communication state, for one of the other network entities (eNB/gNB, etc.) to signal or receive signaling from a UE for mobility purposes (area updates), transitioning out of the inactive state, and/or sending to or receiving data.

Figure 8:
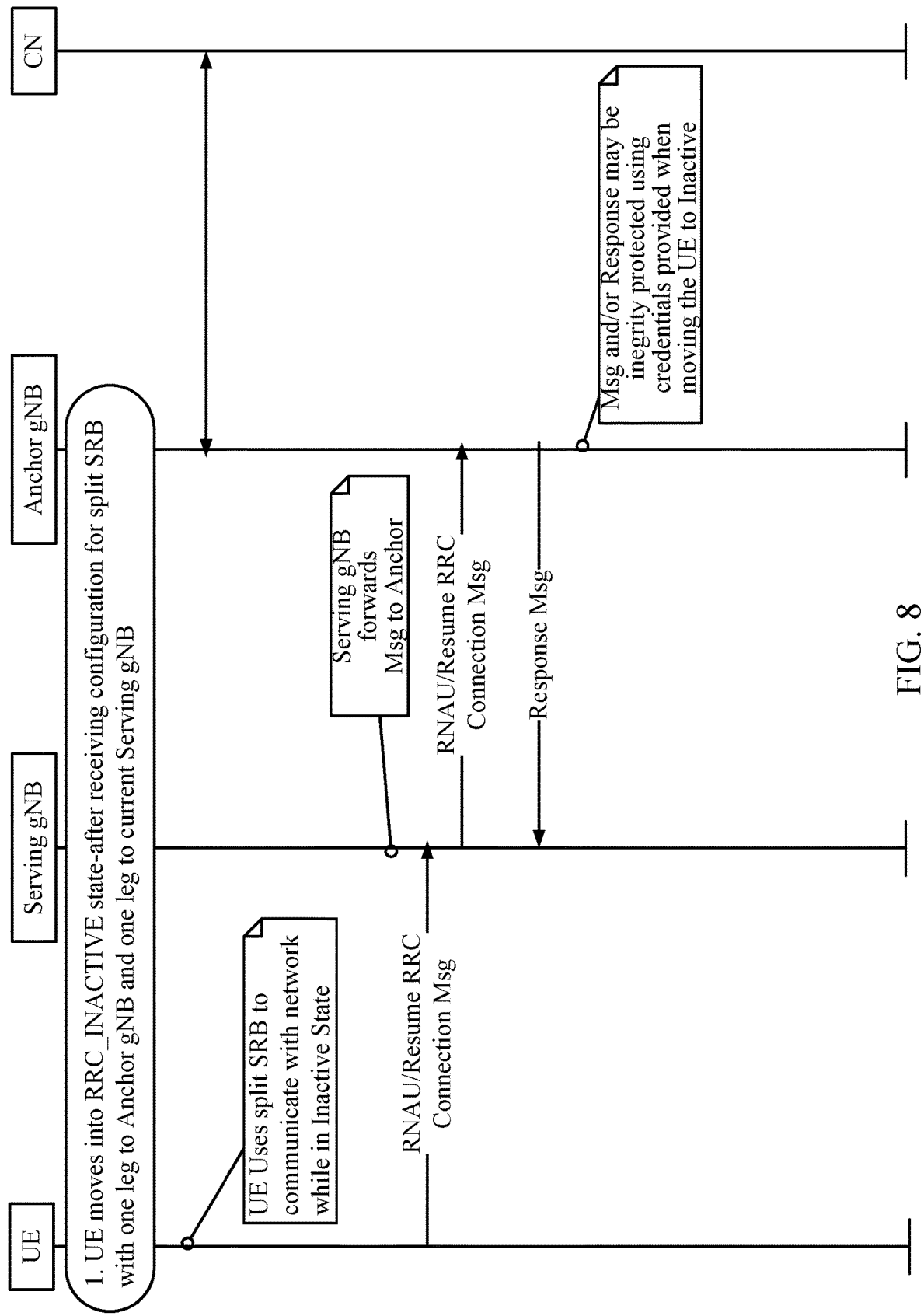
FIG. 8 illustrates an example call flow diagram for signaling to and/or from a UE in an inactive state, in accordance with certain aspects of the present disclosure.

FIG. 8 is a call flow diagram of signaling to and/from a UE in an inactive state, in accordance with aspects of the present disclosure. As illustrated, an anchor node (e.g., a base station or eNB/gNB that an inactive UE has previously connected with that has the UE context for subsequent communication) configures the UE with a split signaling radio bearer (SRB) before transitioning the UE into an inactive state. One leg (link) of the SRB may be to the anchor gNB, while another leg may not be tied to any particular cell and may, thus, be moved to any current serving gNB.

As illustrated, the UE may then use this split SRB to communicate with the network while in the inactive state. For example, the UE may use the split SRB to perform an RNA update and/or send a message to resume an RRC connection. The serving gNB may forward such a message to the Anchor gNB and, similarly, forward a response from the anchor gNB back to the UE (without the need to move the UE context to the serving gNB). As noted above, depending on the case, the message from the UE and/or the response may be integrity protected using credentials provided anchor gNB when moving the UE to the inactive state.

As described above, by configuring the UE with a split SRB which has two legs: one from the anchor gNB and one from the gNB which the UE is currently accessing (e.g., a serving gNB in the non-DC case), the response from the anchor gNB can be sent on this SRB without having to establish a new SRB with the serving gNB.

It should be noted that the term gNB here generally refers to either an NR base station or an LTE base station connected to 5G Core Network (CN as shown in FIG. 8).

Figure 9:
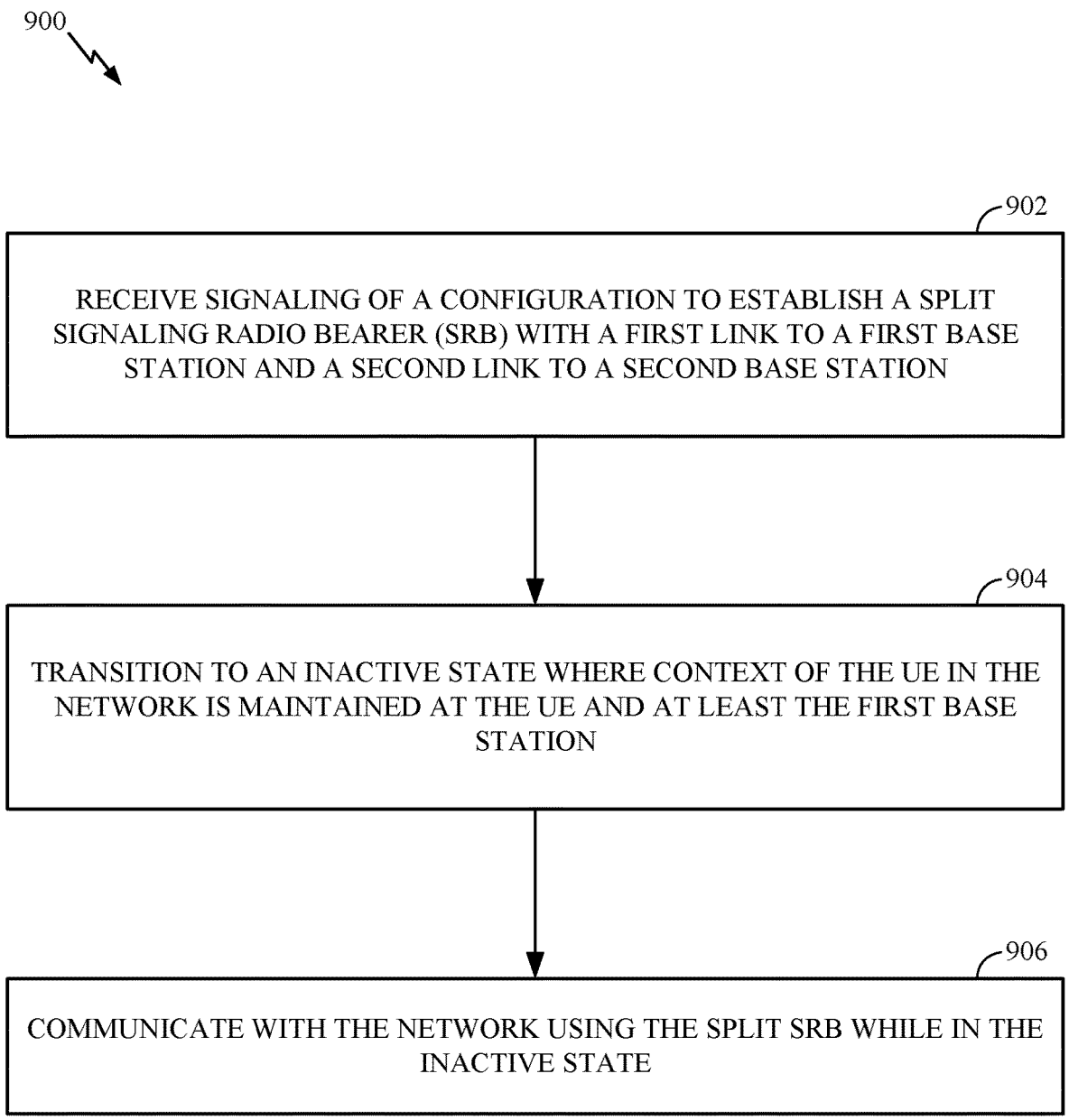
FIG. 9 illustrates example operations that may be performed by a UE that is in an inactive network state, in accordance with certain aspects of the present disclosure.
Figure 10:
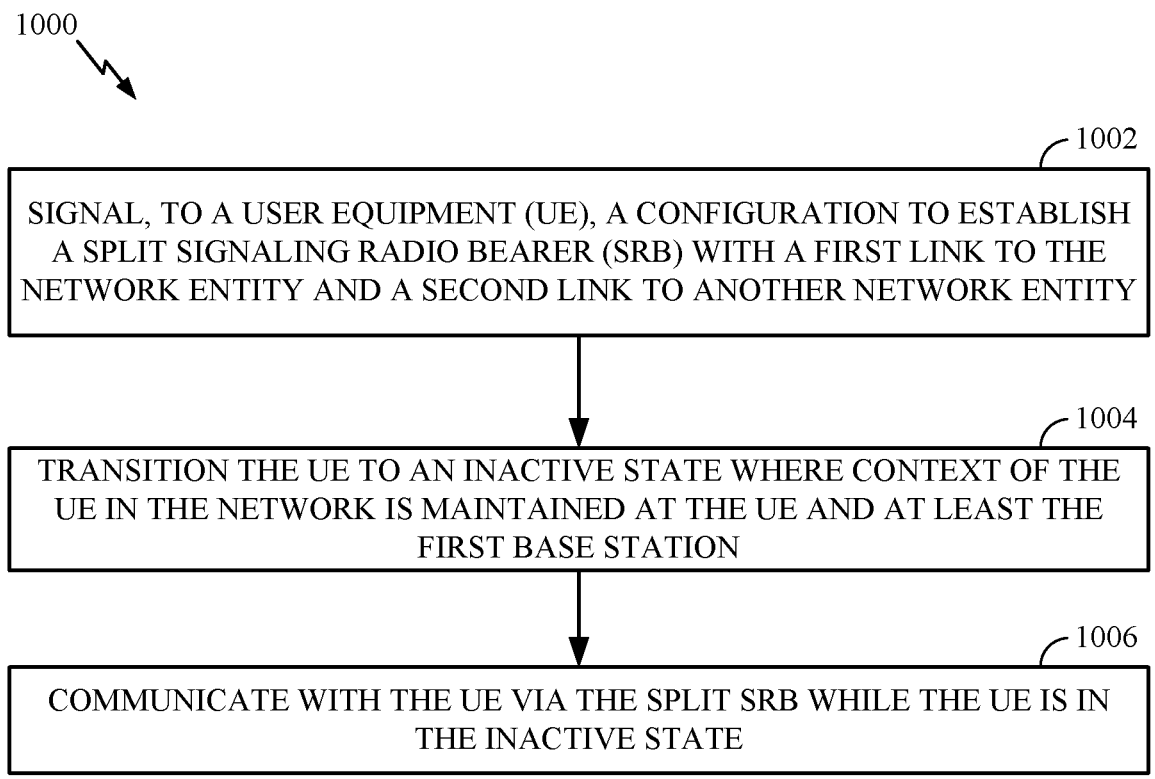
FIG. 10 illustrates example operations that may be performed by an anchor base station, in accordance with certain aspects of the present disclosure.
Figure 11:
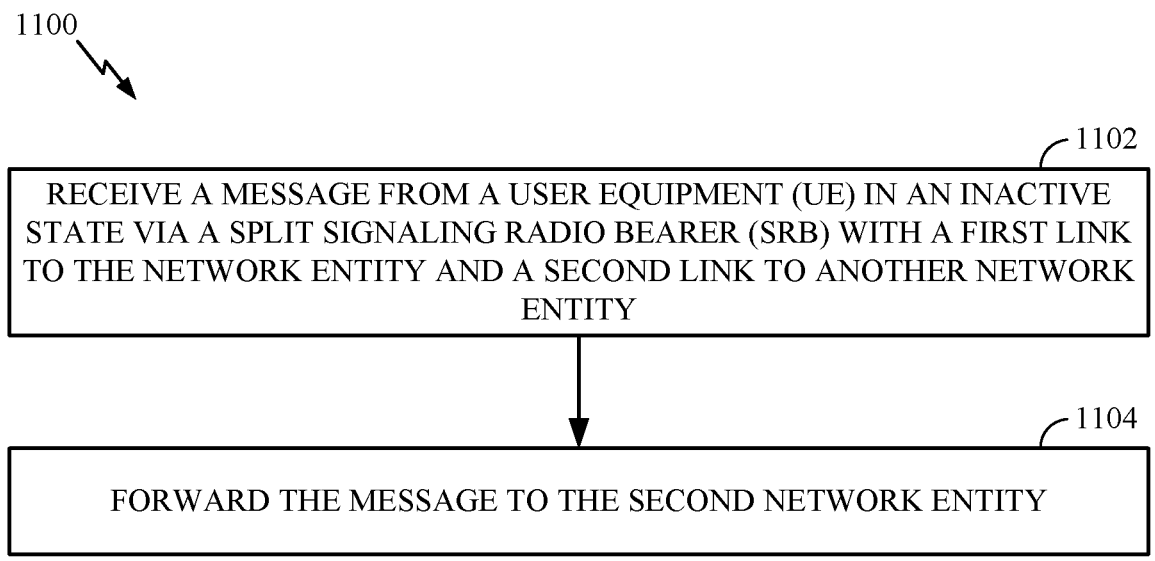
FIG. 11 illustrates example operations that may be performed by a serving base station, in accordance with certain aspects of the present disclosure.

FIGS. 9, 10, and 11 illustrate example operations 900, 1000, and 1100 for establishing and/or utilizing an SRB (e.g., "split" or "virtual split" SRB) for signaling to/from a UE in an inactive state, from the perspective of the UE, anchor gNB, and serving gNB, respectively. For example, operations 900 may be performed by a UE 120 of FIG. 1, while operations 1000 and/or 1100 may be performed by base stations 110 (e.g., acting as MNs and/or SNs).

Operations 900 begin, at 902, by receiving signaling of a configuration to establish a signaling radio bearer (SRB) with a first link to a first base station and a second link to a second base station. As noted above, in the case of a virtual split SRB, one of the links may be "floating" and may or may not be used, depending on where the UE resumes.

At 904, the UE transitions to an inactive state where context of the UE in the network is maintained at the UE and at least the first base station. At 906, the UE communicates with the network using the split SRB while in the inactive state.

Operations 1000 of FIG. 10 begin, at 1002, by signaling, to a user equipment (UE), a configuration to establish a split signaling radio bearer (SRB) with a first link to the network entity and a second link to another network entity. At 1004, the anchor gNB transitions the UE to an inactive state where context of the UE in the network is maintained at the UE and at least the first base station. At 1006, the anchor gNB communicates with the UE via the split SRB while the UE is in the inactive state Operations 1100 of FIG. 11 begin, at 1102, by receiving a message from a user equipment (UE) in an inactive state via a split signaling radio bearer (SRB) with a first link to the network entity and a second link to another network entity. At 1104, the serving gNB forwards the message to the second network entity.

As noted above, the special (split) SRB may have a secondary link that is not tied to a specific cell. The special SRB may be SRB0, SRB1 or SRB2 (or a new type of SRB). The UE keeps the special SRB configuration while in Inactive Mode and uses the special SRB to access a new gNB (different than anchor gNB). The UE may use a default layer 2 (L2) configuration for the SRB leg at the new gNB.

As noted above, the UE may use the security credentials given to the UE by anchor gNB before moving to Inactive. The new gNB forwards UE messages (e.g. RNAU, RRC Connection Resume) to the anchor gNB, for example, based on the UE identification received in the message. The anchor gNB responds to the UE message on the special SRB via the new gNB (i.e., the new serving gNB forwards the response).

When operating in DC mode, the new gNB may also act as a new potential SN. In which case, upon reception of UE message, the MN can configure the new gNB as an SN and release the old SN (and change of SN procedures apply).

As noted above, the signaling techniques described herein may provide flexible options for deciding what type of integrity protection to use for signaling to/from a UE in the inactive state.

For example, a UE in INACTIVE, trying to resume an RRC connection, can receive a MSG4 sent over the split SRB implemented as type SRB0 (without Integrity protection) to move the UE back into INACTIVE (i.e. rejected with wait timer).

While INACTIVE related parameters/configuration typically should not be updated by a MSG4 sent over SRB0 (as it is a non-protected message), implementing the special SRB as SRB1 (or other SRB type with integrity protection) may allow for such updates.

For example, a UE in an INACTIVE state, trying to resume an RRC connection, can receive MSG4 sent over the split SRB as type SRB1 with at least integrity protection to move the UE back into INACTIVE (i.e. not rejected), such as the RNA update use case. The MSG4 (i.e., not rejected) can configure at least the same parameters as can be configured by the message that moves the UE to inactive (e.g. I-RNTI, RNA, RAN DRX cycle, periodic RNAU timer, redirect carrier frequency, for inactive mode mobility control information or reselection priority information).

A UE in INACTIVE, trying to resume the RRC connection, can receive MSG4 sent over the split SRB implemented as type SRB1 with at least integrity protection to move the UE into IDLE. This MSG4 (i.e., SRB1 release to IDLE) can carry same information as RRC Connection release kind of message (e.g., priority, redirect information, idle mode mobility control information, cause and idle mode re-selection information).

A UE in INACTIVE, trying to resume an RRC connection, may not be able to receive MSG4 sent over a split SRB implemented as SRB0 (without Integrity protection) to move the UE into IDLE to stay in IDLE (i.e., without precluding use of fallback to RRC Connection Establishment).

Figure 12:
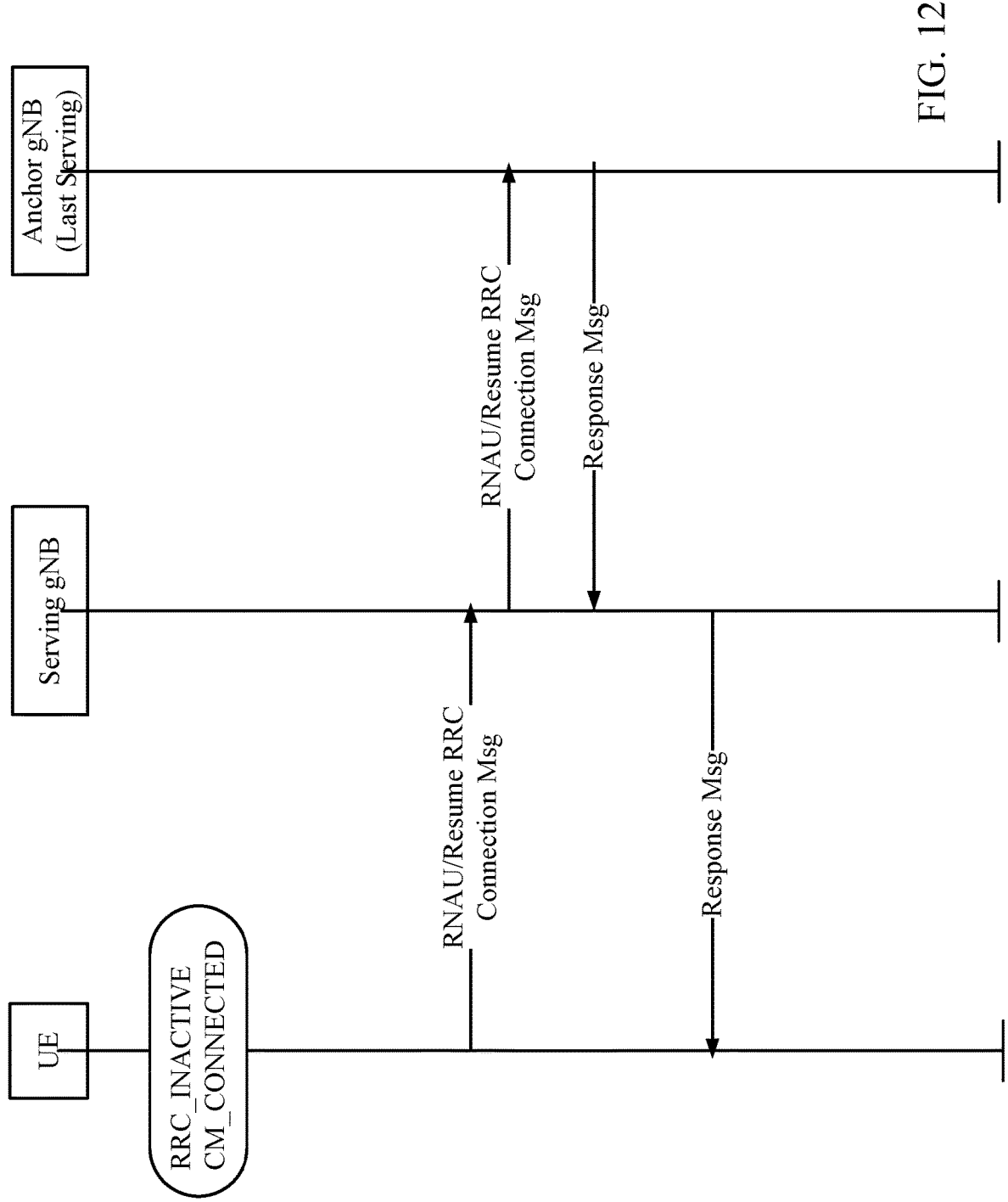
FIG. 12 illustrates an example call flow diagram for RAN notification area (RNA) update signaling, in accordance with certain aspects of the present disclosure.

FIG. 12 illustrates an example call flow diagram for RNA update procedure, for example, when a UE is still within the configured RNA and the last serving gNB decides not to relocate the UE context (to a new gNB) and to keep the UE in RRC_INACTIVE. In this case, the UE may resume from the INACTIVE state (e.g., by providing am RNTI allocated by a last serving gNB and an appropriate cause value). If the new gNB is able to resolve the gNB identity contained in the I-RNTI, that gNB may request that the last serving gNB to provide UE Context (e.g., providing the cause value received in the RNAU). As illustrated, the last serving (anchor) gNB may respond to the gNB, for example, with a RETRIEVE UE CONTEXT FAILURE message including an encapsulated RRCRelease message, which may include a suspend indication. The gNB may forward this RRCRelease message to the UE as a response to the RNAU/Resume RRC connection message.

Example Embodiments

Embodiment 1: A method for wireless communications by a user equipment (UE), comprising receiving signaling of a configuration to establish a signaling radio bearer (SRB) with at least one of a first link to a first network entity and a second link to a second network entity, transitioning to an inactive state where context of the UE in the network is maintained at the UE and at least the first network entity, and communicating with the network using the SRB while in the inactive state.

Embodiment 2: The method of Embodiment 1, wherein the first network entity comprises an anchor base station that signaled the configuration to the UE and the second network entity comprises a base station the UE is using to access the network.

Embodiment 3: The method of any of Embodiments 1 to 2, wherein the UE is supports dual-connectivity, the SRB comprises a split SRB with a first link to the first network entity and a second link to the second network entity, the first network entity comprises a master node (MN), and the second network entity comprises a secondary node (SN).

Embodiment 4: The method of any of Embodiment 3, wherein the MN configures the second network entity to act as an SN and releases another network entity previously acting as an SN to the UE.

Embodiment 5: The method of any of Embodiments 1 to 4, wherein the UE applies integrity protection on the SRB using security credentials obtained from the first network entity before moving to the inactive state.

Embodiment 6: The method of any of Embodiments 1 to 5, wherein the UE applies the configuration to access the network via the SRB when moving to the second network entity.

Embodiment 7: The method of Embodiment 6, wherein communicating with the network comprises performing a radio access network (RAN) notification area (RNA) update procedure using the split bearer.

Embodiment 8: The method of Embodiment 7, wherein performing the RNA update procedure using the split bearer comprises sending an RNA update message to the second network entity, to be forwarded to the first network entity via the SRB and receiving a response to the RNA update message from the first network entity, forwarded from the second network entity, via the SRB.

Embodiment 9: The method of Embodiment 6, wherein communicating with the network comprises sending a message to request transition from the inactive state to resume a radio resource control (RRC) connection using the split bearer.

Embodiment 10: The method of Embodiment 9, further comprising receiving a response to the request from the first network entity, forwarded from the second network entity, via the SRB.

Embodiment 11: The method of Embodiment 10, wherein the response rejects the request and is received via the SRB without integrity protection.

Embodiment 12: The method of any of Embodiments 1 to 11, wherein the response moves the UE back into the inactive state and is received via the SRB with integrity protection.

Embodiment 13: The method of Embodiment 12, wherein the response configures at least some same parameters as configured by a message to move the UE into the inactive state.

Embodiment 14: The method of any of Embodiments 1 to 13, wherein the response moves the UE to an Idle state and is received via the SRB with integrity protection.

Embodiment 15: The method of claim 14, wherein the response carries at least one of: priority, redirect information, idle mode mobility control information, cause or idle mode re-selection information.

Embodiment 16: The method of any of Embodiments 1 to 15, wherein the response indicates the UE is to stay in the Idle state.

Embodiment 17: The method of any of Embodiments 1 to 16, wherein communicating with the network comprises at least one of sending or receiving data via the SRB.

Embodiment 18: A method for wireless communications by a network entity, comprising signaling, to a user equipment (UE), a configuration to establish a signaling radio bearer (SRB) with a first link to the network entity and a second link to another network entity, transitioning the UE to an inactive state where context of the UE in the network is maintained at the UE and at least the first network entity, and communicating with the UE via the SRB while the UE is in the inactive state.

Embodiment 19: The method of Embodiment 18, wherein the network entity comprises an anchor base station that signaled the configuration to the UE and the other network entity comprises a base station the UE is using to access the network.

Embodiment 20: The method of any of Embodiments 18 to 19, wherein the UE is supports dual-connectivity, the SRB comprises a split SRB with a first link to the first network entity and a second link to the second network entity, the network entity comprises a master node (MN), and the other network entity comprises a secondary node (SN).

Embodiment 21: The method of any of Embodiments 18 to 20, wherein the MN configures the other network entity to act as an SN and releases another network entity previously acting as an SN to the UE.

Embodiment 22: The method of any of Embodiments 18 to 21, wherein the network entity applies integrity protection on the SRB using security credentials provided to the UE before moving to the inactive state.

Embodiment 23: The method of any of Embodiments 18 to 22, wherein the UE applies the configuration to access the network via the SRB when moving to the other network entity.

Embodiment 24: The method of Embodiment 23, wherein communicating with the UE comprises receiving a radio access network (RAN) notification area (RNA) update from the UE using the split bearer.

Embodiment 25: The method of Embodiment 24, wherein receiving the RNA update procedure using the split bearer comprises receiving an RNA update message forwarded by the other network entity via the SRB and sending a response to the RNA update message to be forwarded to the UE by the other network entity, via the SRB.

Embodiment 26: The method of any of any of Embodiments 18 to 25, wherein communicating with the UE comprises receiving a message from the UE to request transition from the inactive state to resume a radio resource control (RRC) connection using the split bearer.

Embodiment 27: The method of claim 26, further comprising sending a response to the request to the other network entity, to be forwarded to the UE, via the SRB.

Embodiment 28: The method of claim 27, wherein the response rejects the request and is received via the SRB without integrity protection.

Embodiment 29: The method of any of Embodiments 18-28, wherein the response moves the UE back into the inactive state and is received via the SRB with integrity protection.

Embodiment 30: The method of claim 29, wherein the response configures at least some same parameters as configured by a message to move the UE into the inactive state.

Embodiment 31: The method of any of Embodiments 18-30, wherein the response moves the UE to an Idle state and is received via the SRB with integrity protection.

Embodiment 32: The method of any of Embodiments 18-31, wherein the response carries at least one of: priority, redirect information, idle mode mobility control information, cause or idle mode re-selection information.

Embodiment 33: The method of any of Embodiments 18-31, wherein the response indicates the UE is to stay in the Idle state.

Embodiment 34: The method of any of Embodiments 18-33, wherein communicating with the UE comprises at least one of sending or receiving data via the SRB.

Embodiment 35: A method for wireless communications by a network entity, comprising receiving a message from a user equipment (UE) in an inactive state via a signaling radio bearer (SRB) with a first link to the network entity and a second link to another network entity and forwarding the message to the second network entity.

Embodiment 36: The method of Embodiment 35, wherein the other network entity comprises an anchor base station that signaled the configuration to the UE and the network entity comprises a base station the UE is using to access the network.

Embodiment 37: The method of any of Embodiments 35 to 36, wherein the UE is supports dual-connectivity, the other network entity comprises a master node (MN), and the network entity comprises a secondary node (SN).

Embodiment 38: The method of Embodiment 37, wherein the MN configures the network entity to act as an SN and releases another network entity previously acting as an SN to the UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 13, 17, and 18.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving signaling of a configuration to establish a signaling radio bearer (SRB) with at least one of a first link to a first network entity and a second link to a second network entity;
   transitioning to an inactive state where context of the UE in the network is maintained at the UE and at least the first network entity; and
   communicating with the network using the SRB while in the inactive state
   wherein the UE applies the configuration to access the network via the SRB when moving to the second network entity; and
   wherein communicating with the network comprises performing a radio access network (RAN) notification area (RNA) update procedure using the split bearer.

2. The method of claim 1, wherein performing the RNA update procedure using the split bearer comprises:
   sending an RNA update message to the second network entity, to be forwarded to the first network entity via the SRB; and
   receiving a response to the RNA update message from the first network entity, forwarded from the second network entity, via the SRB.

3. The method of claim 1, wherein communicating with the network comprises sending a message to request transition from the inactive state to resume a radio resource control (RRC) connection using the split bearer.

4. The method of claim 3, further comprising:
   receiving a response to the request from the first network entity, forwarded from the second network entity, via the SRB.

5. The method of claim 4, wherein the response rejects the request and is received via the SRB without integrity protection.

6. The method of claim 4, wherein the response moves the UE back into the inactive state and is received via the SRB with integrity protection.

7. The method of claim 6, wherein the response configures at least some same parameters as configured by a message to move the UE into the inactive state.

8. The method of claim 4, wherein the response moves the UE to an Idle state and is received via the SRB with integrity protection.

9. The method of claim 8, wherein the response carries at least one of: priority, redirect information, idle mode mobility control information, cause or idle mode re-selection information.

10. The method of claim 8, wherein the response indicates the UE is to stay in the Idle state.

11. The method of claim 1, wherein communicating with the network comprises at least one of sending or receiving data via the SRB.

12. A method for wireless communications by a network entity, comprising:
    signaling, to a user equipment (UE), a configuration to establish a split signaling radio bearer (SRB) with a first link to the network entity and a second link to another network entity;
    transitioning the UE to an inactive state where context of the UE in the network is maintained at the UE and at least the network entity; and
    communicating with the UE via the SRB while the UE is in the inactive state
    wherein:
       the UE supports dual-connectivity;
       the SRB comprises a split SRB with a first link to the network entity and a second link to the other network entity;
       the network entity comprises a master node (MN);
       the other network entity comprises a secondary node (SN);
       the MN configures the other network entity to act as an SN and releases another network entity previously acting as an SN to the UE, and
       the UE applies the configuration to access the network via the SRB when moving to the other network entity.

13. The method of claim 12, wherein the network entity applies integrity protection on the SRB using security credentials provided to the UE before moving to the inactive state.

14. The method of claim 12, wherein communicating with the UE comprises receiving a radio access network (RAN) notification area (RNA) update from the UE using the split bearer.

15. The method of claim 14, wherein receiving the RNA update procedure using the split bearer comprises:
    receiving an RNA update message forwarded by the other network entity via the SRB; and
    sending a response to the RNA update message to be forwarded to the UE by the other network entity, via the SRB.

16. The method of claim 12, wherein communicating with the UE comprises receiving a message from the UE to request transition from the inactive state to resume a radio resource control (RRC) connection using the split bearer.

17. The method of claim 16, further comprising:
    sending a response to the request to the other network entity, to be forwarded to the UE, via the SRB.

18. The method of claim 17, wherein the response rejects the request and is received via the SRB without integrity protection.

19. The method of claim 17, wherein the response moves the UE back into the inactive state and is received via the SRB with integrity protection.

20. The method of claim 19, wherein the response configures at least some same parameters as configured by a message to move the UE into the inactive state.

21. The method of claim 17, wherein the response moves the UE to an Idle state and is received via the SRB with integrity protection.

22. The method of claim 21, wherein the response carries at least one of: priority, redirect information, idle mode mobility control information, cause or idle mode re-selection information.

23. The method of claim 21, wherein the response indicates the UE is to stay in the Idle state.

24. The method of claim 12, wherein communicating with the UE comprises at least one of sending or receiving data via the SRB.

25. A method for wireless communications by a network entity, comprising:
- receiving a message from a user equipment (UE) in an inactive state via a split signaling radio bearer (SRB) with a first link to the network entity and a second link to another network entity; and
- forwarding the message to the second network entity wherein:
  - the other network entity comprises an anchor base station that signaled the configuration to the UE; and
  - the network entity comprises a base station the UE is using to access the network.

* * * * *